United States Patent
Sherlock

(10) Patent No.: US 10,594,442 B2
(45) Date of Patent: Mar. 17, 2020

(54) END-TO-END NEGATIVE ACKNOWLEDGMENT

(71) Applicant: HEWLETT PACKARD ENTERPRISE DEVELOPMENT LP, Houston, TX (US)

(72) Inventor: Derek A. Sherlock, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/513,891

(22) PCT Filed: Oct. 24, 2014

(86) PCT No.: PCT/US2014/062196
§ 371 (c)(1),
(2) Date: Mar. 23, 2017

(87) PCT Pub. No.: WO2016/064417
PCT Pub. Date: Apr. 28, 2016

(65) Prior Publication Data
US 2017/0302409 A1    Oct. 19, 2017

(51) Int. Cl.
*H04L 1/16* (2006.01)
*H04L 1/08* (2006.01)
*H04L 12/709* (2013.01)

(52) U.S. Cl.
CPC ........... *H04L 1/1671* (2013.01); *H04L 1/08* (2013.01); *H04L 1/1621* (2013.01); *H04L 1/1628* (2013.01); *H04L 45/245* (2013.01)

(58) Field of Classification Search
CPC ................. H04L 1/1671; H04L 1/1621
See application file for complete search history.

(56) References Cited

U.S. PATENT DOCUMENTS

| | | | |
|---|---|---|---|
| 5,032,744 A | | 7/1991 | Wai Yeung Liu |
| 5,243,592 A | * | 9/1993 | Perlman .............. H04L 45/44 370/252 |

(Continued)

FOREIGN PATENT DOCUMENTS

| | | |
|---|---|---|
| CN | 101576805 A | 11/2009 |
| CN | 102521058 A | 6/2012 |

(Continued)

OTHER PUBLICATIONS

International Search Report & Written Opinion received in PCT Application No. PCT/US2014/062196, dated Jun. 30, 2015, 15 pages.

(Continued)

*Primary Examiner* — Joseph D Torres
(74) *Attorney, Agent, or Firm* — Sheppard Mullin Richter & Hampton LLP

(57) ABSTRACT

A processing device includes a transceiver to be coupled to a link and control logic coupled to the transceiver. The control logic is to assign a unique sequence identifier to each packet to be transmitted across the link to a receiving node and transmit packets via the transceiver across the link to the receiving node. Each packet is to have a unique sequence identifier. The control logic also is to receive a message from the receiving node, the message containing the sequence identifier of a packet not correctly received by the receiving node. Based on the received message, the control logic is to cause an end-to-end negative acknowledgment (E2E NAK) packet to be transmitted to an originating node of the packet that was not correctly received.

14 Claims, 10 Drawing Sheets

(56) References Cited

U.S. PATENT DOCUMENTS

| | | | |
|---|---|---|---|
| 5,327,553 A | 7/1994 | Jewett et al. | |
| 5,533,999 A | 7/1996 | Hood et al. | |
| 5,546,535 A | 8/1996 | Stallmo et al. | |
| 5,555,266 A * | 9/1996 | Buchholz | H04L 1/1614 370/347 |
| 5,633,996 A | 5/1997 | Hayashi et al. | |
| 5,633,999 A | 5/1997 | Clowes et al. | |
| 5,724,046 A | 3/1998 | Martin et al. | |
| 5,905,871 A | 5/1999 | Buskens et al. | |
| 6,073,218 A | 6/2000 | Dekoning et al. | |
| 6,081,907 A * | 6/2000 | Witty | H04L 12/1877 714/6.1 |
| 6,092,191 A | 7/2000 | Shimbo et al. | |
| 6,141,324 A * | 10/2000 | Abbott | H04L 47/2416 370/236 |
| 6,151,659 A | 11/2000 | Solomon et al. | |
| 6,181,704 B1 * | 1/2001 | Drottar | H04L 1/0057 370/231 |
| 6,389,373 B1 | 5/2002 | Ohya | |
| 6,457,098 B1 | 9/2002 | Dekoning et al. | |
| 6,467,024 B1 | 10/2002 | Bish et al. | |
| 6,490,659 B1 | 12/2002 | McKean et al. | |
| 6,502,165 B1 | 12/2002 | Kishi et al. | |
| 6,510,500 B2 | 1/2003 | Sarkar | |
| 6,542,960 B1 | 4/2003 | Wong et al. | |
| 6,654,830 B1 | 11/2003 | Taylor et al. | |
| 6,735,645 B1 | 5/2004 | Weber et al. | |
| 6,826,247 B1 | 11/2004 | Elliott et al. | |
| 6,834,326 B1 | 12/2004 | Wang et al. | |
| 6,911,864 B2 | 6/2005 | Bakker et al. | |
| 6,938,091 B2 | 8/2005 | Das Sharma | |
| 6,970,987 B1 | 11/2005 | Ji et al. | |
| 7,366,808 B2 | 4/2008 | Kano et al. | |
| 7,506,368 B1 | 3/2009 | Kersey et al. | |
| 7,738,540 B2 * | 6/2010 | Yamasaki | H04B 7/022 375/133 |
| 7,839,858 B2 * | 11/2010 | Wiemann | H04L 1/0002 370/394 |
| 7,908,513 B2 | 3/2011 | Ogasawara et al. | |
| 7,934,055 B2 | 4/2011 | Flynn et al. | |
| 7,996,608 B1 | 8/2011 | Chatterjee et al. | |
| 8,005,051 B2 * | 8/2011 | Watanabe | H04L 1/1628 370/335 |
| 8,018,890 B2 * | 9/2011 | Venkatachalam | H04L 1/188 370/279 |
| 8,054,789 B2 * | 11/2011 | Boariu | H04L 1/1614 370/242 |
| 8,103,869 B2 | 1/2012 | Balandin et al. | |
| 8,135,906 B2 | 3/2012 | Wright et al. | |
| 8,161,236 B1 | 4/2012 | Noveck et al. | |
| 8,169,908 B1 | 5/2012 | Sluiter et al. | |
| 8,171,227 B1 | 5/2012 | Goldschmidt et al. | |
| 8,332,704 B2 * | 12/2012 | Chang | H04L 1/1854 370/310 |
| 8,341,459 B2 | 12/2012 | Kaushik et al. | |
| 8,386,834 B1 | 2/2013 | Goel et al. | |
| 8,386,838 B1 | 2/2013 | Byan | |
| 8,462,690 B2 * | 6/2013 | Chang | H04L 1/1607 370/243 |
| 8,483,116 B2 * | 7/2013 | Chang | H04L 1/0081 370/226 |
| 8,605,643 B2 * | 12/2013 | Chang | H04L 1/1883 370/315 |
| 8,619,606 B2 * | 12/2013 | Nagaraja | H04B 7/15557 370/252 |
| 8,621,147 B2 | 12/2013 | Galloway et al. | |
| 8,667,322 B1 | 3/2014 | Chatterjee et al. | |
| 8,700,570 B1 | 4/2014 | Marathe et al. | |
| 8,793,449 B1 | 7/2014 | Kimmel | |
| 8,812,901 B2 | 8/2014 | Sheffield, Jr. | |
| 9,128,948 B1 | 9/2015 | Raorane | |
| 9,166,541 B2 | 10/2015 | Funato et al. | |
| 9,298,549 B2 | 3/2016 | Camp et al. | |
| 9,621,934 B2 | 4/2017 | Seastrom et al. | |
| 2001/0002480 A1 | 5/2001 | Dekoning et al. | |
| 2002/0162076 A1 | 10/2002 | Talagala et al. | |
| 2003/0037071 A1 | 2/2003 | Harris et al. | |
| 2003/0126315 A1 | 7/2003 | Tan et al. | |
| 2004/0133573 A1 | 7/2004 | Miloushev et al. | |
| 2004/0233078 A1 | 11/2004 | Takehara | |
| 2005/0027951 A1 | 2/2005 | Piccirillo et al. | |
| 2005/0044162 A1 | 2/2005 | Liang et al. | |
| 2005/0120267 A1 | 6/2005 | Burton et al. | |
| 2005/0144406 A1 | 6/2005 | Chong, Jr. | |
| 2005/0157697 A1 | 7/2005 | Lee et al. | |
| 2006/0112304 A1 | 5/2006 | Subramanian et al. | |
| 2006/0129559 A1 | 6/2006 | Sankaran et al. | |
| 2006/0264202 A1 | 11/2006 | Hagmeier et al. | |
| 2007/0028041 A1 | 2/2007 | Hallyal et al. | |
| 2007/0140692 A1 | 6/2007 | Decusatis et al. | |
| 2007/0168693 A1 | 7/2007 | Pittman | |
| 2007/0174657 A1 | 7/2007 | Ahmadian et al. | |
| 2008/0060055 A1 | 3/2008 | Lau | |
| 2008/0137669 A1 | 6/2008 | Balandina et al. | |
| 2008/0201616 A1 | 8/2008 | Ashmore | |
| 2008/0281876 A1 | 11/2008 | Mimatsu | |
| 2009/0080432 A1 | 3/2009 | Kolakeri et al. | |
| 2009/0259882 A1 | 10/2009 | Shellhamer | |
| 2009/0313313 A1 | 12/2009 | Yokokawa et al. | |
| 2010/0107003 A1 | 4/2010 | Kawaguchi | |
| 2010/0114889 A1 | 5/2010 | Rabii et al. | |
| 2011/0109348 A1 | 5/2011 | Chen et al. | |
| 2011/0173350 A1 | 7/2011 | Coronado et al. | |
| 2011/0208994 A1 | 8/2011 | Chambliss et al. | |
| 2011/0213928 A1 | 9/2011 | Grube et al. | |
| 2011/0246819 A1 | 10/2011 | Callaway et al. | |
| 2011/0314218 A1 | 12/2011 | Bert | |
| 2012/0032718 A1 | 2/2012 | Chan et al. | |
| 2012/0059800 A1 | 3/2012 | Guo | |
| 2012/0096329 A1 | 4/2012 | Taranta, II | |
| 2012/0137098 A1 | 5/2012 | Wang et al. | |
| 2012/0166699 A1 | 6/2012 | Kumar et al. | |
| 2012/0166909 A1 | 6/2012 | Schmisseur et al. | |
| 2012/0201289 A1 | 8/2012 | Abdalla et al. | |
| 2012/0204032 A1 | 8/2012 | Wilkins et al. | |
| 2012/0213055 A1 | 8/2012 | Bajpai et al. | |
| 2012/0297272 A1 | 11/2012 | Bakke et al. | |
| 2012/0311255 A1 | 12/2012 | Chambliss et al. | |
| 2013/0060948 A1 | 3/2013 | Ulrich et al. | |
| 2013/0128721 A1 | 5/2013 | DeCusatis et al. | |
| 2013/0128884 A1 | 5/2013 | DeCusatis et al. | |
| 2013/0138759 A1 | 5/2013 | Chen et al. | |
| 2013/0148702 A1 | 6/2013 | Payne | |
| 2013/0227216 A1 | 8/2013 | Cheng et al. | |
| 2013/0246597 A1 | 9/2013 | Iizawa et al. | |
| 2013/0297976 A1 | 11/2013 | McMillen | |
| 2013/0311822 A1 | 11/2013 | Kotzur et al. | |
| 2013/0312082 A1 | 11/2013 | Izu et al. | |
| 2014/0067984 A1 | 3/2014 | Danilak | |
| 2014/0095865 A1 | 4/2014 | Yerra et al. | |
| 2014/0115232 A1 | 4/2014 | Goss et al. | |
| 2014/0136799 A1 | 5/2014 | Fortin | |
| 2014/0269731 A1 | 9/2014 | DeCusatis et al. | |
| 2014/0281688 A1 | 9/2014 | Tiwari et al. | |
| 2014/0304469 A1 | 10/2014 | Wu | |
| 2014/0331297 A1 | 11/2014 | Innes et al. | |
| 2015/0012699 A1 | 1/2015 | Rizzo et al. | |
| 2015/0095596 A1 | 4/2015 | Yang et al. | |
| 2015/0146614 A1 | 5/2015 | Yu et al. | |
| 2015/0199244 A1 | 7/2015 | Venkatachalam et al. | |
| 2015/0288752 A1 | 10/2015 | Voigt | |
| 2016/0034186 A1 | 2/2016 | Weiner et al. | |
| 2016/0170833 A1 | 6/2016 | Segura et al. | |
| 2016/0196182 A1 | 7/2016 | Camp et al. | |
| 2016/0226508 A1 | 8/2016 | Kurooka et al. | |
| 2017/0253269 A1 | 9/2017 | Kanekawa et al. | |
| 2017/0302409 A1 | 10/2017 | Sherlock | |
| 2017/0346742 A1 | 11/2017 | Shahar et al. | |

FOREIGN PATENT DOCUMENTS

| | | |
|---|---|---|
| CN | 104333358 A | 2/2015 |
| EP | 1347369 B1 | 11/2012 |

(56) References Cited

FOREIGN PATENT DOCUMENTS

| IN | 1546/MUM/2013 | | 3/2015 |
|---|---|---|---|
| TW | 201346530 | A | 11/2013 |
| WO | 02/91689 | A1 | 11/2002 |
| WO | 2014/120136 | A1 | 8/2014 |

OTHER PUBLICATIONS

Kang, Y. et al., "Fault-Tolerant Flow Control in On-Chip Networks," (Research Paper), Proceedings for IEEE, May 3-6, 2010, 8 pages, available at http://citeseerx.ist.psu.edu/viewdoc/download?doi=10.1.1.228.7865&rep=rep1&type=pdf.
Xingyuan, T. et al., "An Offset Cancellation Technique in a Switched-Capacitor Comparator for SAR ADCs"; (Research Paper), „Journal of Semiconductors 33.1. „Jan. 2012, 5 pages, http://www.jos.ac.cn/bdtxbcn/ch/reader/create_pdf.aspx?file_no=11072501.
Razavi, B. et al., "Design Techniques for High-Speed, High-Resolution Comparators," (Research Paper). IEEE Journal of Solid-State Circuits 27.12, Dec. 12, 1992, pp. 1916-1926, http://www.seas.ucla.edu/brweb/papers/Journals/R%26WDec92_2.pdf.
Mao, Y. et al., A New Parity-based Migration Method to Expand Raid-5, (Research Paper), Nov. 4, 2013, 11 Pages.
Li, M. et al.: Toward I/O-Efficient Protection Against Silent Data Corruptions in RAID Arrays, (Research Paper); Jun. 2-6, 2014; 12 Pages.
Kimura et al., "A 28 Gb/s 560 mW Multi-Standard SerDes With Single-Stage Analog Front-End and 14-Tap Decision Feedback Equalizer in 28 nm CMOS," IEEE Journal of Solid-State Circuits, vol. 49, No. 12, Dec. 2014, pp. 3091-3103.
International Searching Authority, The International Search Report and the Written Opinion, Feb. 26, 2015, 10 Pages.
International Search Report and Written Opinion received for PCT Patent Application No. PCT/US2015/013921, dated Oct. 28, 2015, 10 pages.
International Search Report and Written Opinion received for PCT Patent Application No. PCT/US2015/013898, dated Oct. 8, 2015, 9 pages.
International Search Report and Written Opinion received for PCT Patent Application No. PCT/US2015/013817, dated Oct. 29, 2015, 11 pages.
International Search Report and Written Opinion received for PCT Patent Application No. PCT/US2014/053704, dated May 15, 2015, 11 pages.
International Preliminary Report on Patentability received for PCT Patent Application No. PCT/US2015/013921, dated Aug. 10, 2017, 9 pages.
International Preliminary Report on Patentability received for PCT Patent Application No. PCT/US2014/062196, dated May 4, 2017, 12 pages.
Amiri, K. et al., Highly Concurrent Shared Storage, (Research Paper), Sep. 7, 1999, 25 Pages.
Almeida, P. S., et al; Scalable Eventually Consistent Counters Over Unreliable Networks; Jul. 12, 2013; 32 Pages.
International Search Report and Written Opinion received for PCT Patent Application No. PCT/US2015/023708, dated Apr. 22, 2016, 11 pages.
International Search Report and Written Opinion received for PCT Patent Application No. PCT/US2014/049193, dated Feb. 26, 2015, 8 pages.
International Preliminary Report on Patentability received for PCT Patent Application No. PCT/US2015/023708, dated Oct. 12, 2017, 10 pages.
International Preliminary Report on Patentability received for PCT Patent Application No. PCT/US2015/013898, dated Aug. 10, 2017, 8 pages.
International Preliminary Report on Patentability received for PCT Patent Application No. PCT/US2015/013817, dated Aug. 10, 2017, 9 pages.
International Preliminary Report on Patentability received for PCT Patent Application No. PCT/US2014/053704, dated Mar. 16, 2017, 10 pages.
International Preliminary Report on Patentability received for PCT Patent Application No. PCT/US2014/049193, dated Feb. 9, 2017, 7 pages.
EMC2; High Availability and Data Protection with EMC Isilon Scale-out NAS, (Research Paper); Nov. 2013; 36 Pages.
Do I need a second RAID controller for fault-tolerance ?, (Research Paper); Aug. 22, 2010; 2 Pages; http://serverfault.com/questions/303869/do-i-need-a-second-raid-controller-for-fault-tolerance.

\* cited by examiner

END-TO-END NEGATIVE ACKNOWLEDGMENT

BACKGROUND

Many network fabrics include various switches, routers, etc. to receive and forward packets to thereby permit originating endpoint nodes to send packets to destination endpoint nodes. A link is a communication pipeline between adjacent nodes in the fabric. The nodes on either end of a link may include endpoint nodes which produce and consume traffic, and intermediate nodes which propagate traffic from one node to another node. Endpoint nodes may comprise, for example, central processing units (CPUs), memory devices, storage devices, peripherals, accelerators, renderers, graphical display devices, etc. Intermediate nodes may comprise, for example, switches, routers, proxies, translators, repeaters, protocol converters, etc. A packet may be transmitted from a transmitting node to a receiving node over a dedicated link between such nodes.

Some networks employ end-to-end (E2E) retry, link level retry (LLR), or both, to ensure that a packet arrives at its intended destination without error. LLR addresses transient CRC-detectable packet corruption due to electrical interference for packets crossing an individual link. The LLR mechanism is implemented across each link independently of the other links. LLR assigns unique sequence numbers to individual packets transmitted across a given link so that if an individual packet experiences an error during transmission over a given link, the receiving node can inform the transmitting node for that link can be made aware of that fact (via a link level negative acknowledgment (NAK) message from the receiving node) and can retry (i.e., resend) the packet again across the link. Each transmitting node stores copies of its outgoing packets in they need to be re-sent. If a receiving node detects an error with a packet received from a transmitting node, the receiving node sends the link level NAK message back across the link to the transmitting node. The link level NAK message includes the sequence number of the packet that had the error. The transmitting node responds to the link level NAK message by resending the identified packet.

E2E retry may be used in combination with LLR, or alone. E2E retry permits an originating endpoint node to resend a packet if an acknowledgment of that packet is not timely received from the destination endpoint node. E2E can protect against component or link failures along a route; by migrating the retry to an alternate route.

BRIEF DESCRIPTION OF THE DRAWINGS

For a detailed description of various examples; reference will now be made to the accompanying drawings in which.

DETAILED DESCRIPTION

For LLR to work, each transmitting node maintains local storage for its outgoing packets in case a receiving node detects an error and requests the transmitting node to retry a particular packet. The amount of local storage can be large and generally scales with the link speed (packet sending rate) and the round-trip latency across the link being driven (i.e., the total time taken for a packet to cross the link, and for a corresponding acknowledgement to cross back in the other direction).

The disclosed implementations avoid the need for as much local storage. In at least some implementations, sufficient local storage in a node is provided for storage of identification information of the originating node for a given packet and the identity of the packet. Local storage in the node for the packet itself is not needed or provided. If a transmitting node receives a link-level NAK for a particular packet, rather than resending the requested packet, the transmitting node sends an end-to-end negative acknowledgment (E2E NAK) packet back to the endpoint node that originated the packet in the first place (referred to herein as the "originating node"). The E2E NAK packet may be routed back to the originating node along the same path (but in the reverse direction) that the original packet took from the originating endpoint node to the transmitting node. At that point, the E2E retry mechanism of the network will cause the originating node to resend the packet through the fabric. In other words, the nodes of the network rely on the E2E retry mechanism to thereby avoid having to store copies of packets pending a potential link level NAK of any given packet.

Figure 1:
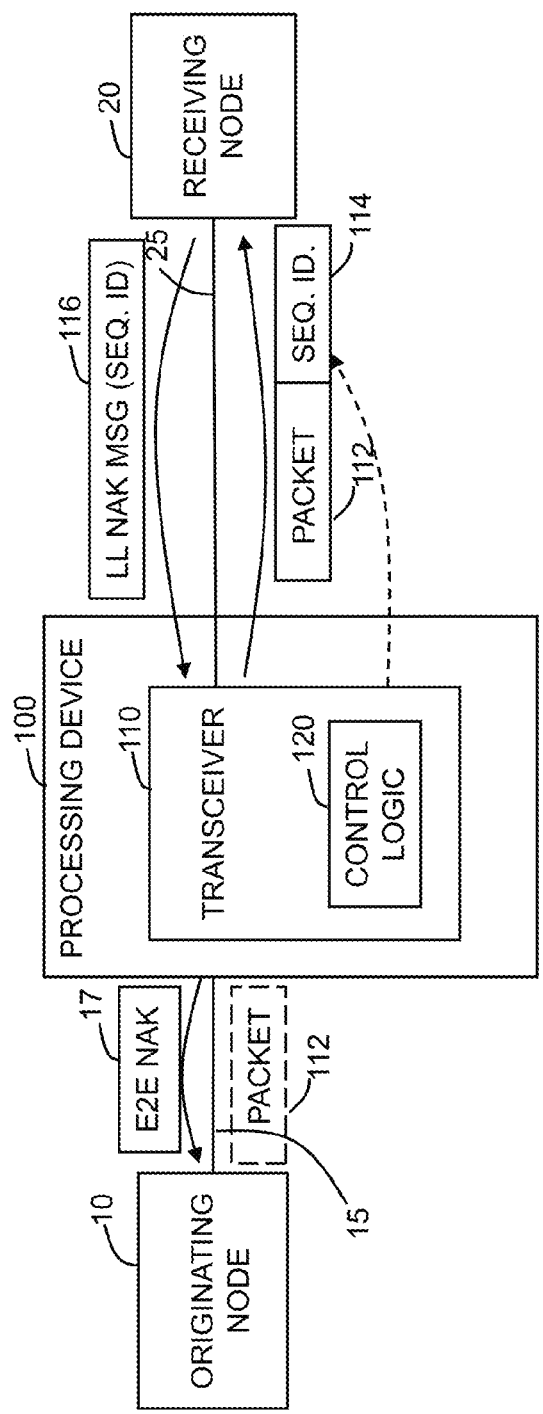
FIG. 1 shows a system in accordance with various examples.

FIG. 1 illustrates one example of a processing device 100 which receives a packet 112 from an originating node 10 across a link 15 and transmits the packet 112 across link 25 to a receiving node 20. The processing device 10 may receive the packet directly from the originating node 10 or indirectly via other processing devices. The originating node 10 originates (e.g., creates) the packet and the receiving node 20 may consume the packet or forward it on to another node in the network. The processing device 100 may be implemented as a switch, router, proxy, translator, repeater, protocol converter, or other type of network device. The processing device 100 may be an intermediate node in a network fabric along a path between originating and destination endpoint nodes. While FIG. 1 illustrates the processing device 100 coupled to the originating node 1, the processing device 100 may be coupled to the originating node through one or more additional intermediate nodes (e.g., other processing devices 100). The processing device 100 receives and forwards packets, generally bidirectionally.

In the example of FIG. 1, the processing device 100 is coupled to the originating and receiving nodes 10, 20 via links 15 and 25, respectively. The processing device 100 includes a transceiver 110 coupled to link 25. Control logic 120 is part of, or otherwise accessible to, the transceiver 110. An additional transceiver may be included as well as to couple to link 15. The transceiver 110 may include a receiver and transmitter and thus facilitate bidirectional communications across link 25 to the receiving node 20. Similar bidirectional communications are possible as well between processing device 100 and originating node 10 across link 15. In some implementations, the processing device 100 may include multiple transceivers 110—one to support each link to which the processing device is to be coupled.

The control logic 120 may be implemented as a programmable hardware processor that executes machine instructions, a discrete circuit or any other type of logic that implements the functionality described herein. For example, the control logic 120 may control the operation of the transceiver 110 to send packets, received from originating node 10, across link 25 to the receiving node 20. The control logic 120 may assign a unique sequence identifier to each packet to be transmitted across link 25 to receiving node 20. FIG. 1 shows an example of a packet 112 to which a sequence identifier 114 has been included. The packet 112, which may have been received from the originating node 10, and its sequence identifier are transmitted across link 25 to the receiving node 20. The sequence identifier 114 uniquely differentiates each packet 112 from other packets transmitted across link 25 so that if the receiving node 20 receives and detects an error with a packet, the receiving node 20 can use that packets unique sequence identifier to notify the processing device 100 that the packet was found to be corrupted upon receipt.

In some implementations, the sequence identifiers of packets traversing a particular link are specific only to that particular link. For example, if a packet has "5" for its sequence identifier as the packet is transmitted across link 25, the sequence identifier 5 does not follow that packet as it is forwarded on by the receiving node 20 across other links. A packet that has the same sequence identifier on two different links is coincidental.

The control logic 120 may transmit packets (e.g., packets including sequence identifiers) to be transmitted across link 25 to the receiving node 20, which may also include a transceiver that functions similar to the transceiver 110. Any given packet transmitted by transceiver 110 to receiving node 20 may be received by the receiving node with an error detected by the receiving node (e.g., by the transceiver in the receiving node). If the receiving node 20 detects an error with a packet received from the processing device 100, the receiving node 20 may send a link level NAK message (LL NAK MSG) 116 to the processing device. For example, if packet 112 with its unique sequence identifier 114 is received by the receiving node 20 and detected to have an error, the receiving node may send back a link level NAK message 116 containing the sequence identifier 114 of packet 112. If a packet is not determined to have an error, the receiving node 20 may send a link level acknowledgment (ACK) to transceiver 110.

While some processing devices 100 might resend the packet associated with the sequence identifier contained in the retry message, in accordance with the disclosed examples, transceiver 110 may not include sufficient storage to store a copy of packet 112 in, for example, a retry buffer and thus may not resend the designated packet. Instead, based on the link level NAK message, the control logic 120 of the processing device 100 may generate and transmit an E2E NAK packet 17 back to the originating node 10 (i.e., the node that originated the packet 112) detected to have an error. The E2E NAK packet 17 contains information that can be used to uniquely identify a particular packet (e.g., the packet 112 detected to have an error by the receiving node 20 in this example). The E2E NAK packet 17 indicates to the originating node that the packet associated with the E2E NAK packet was not correctly received at its intended destination endpoint node, which may have been receiving node 20 or a node further downstream from node 20. The E2E NAK packet 17 may not indicate where along the path from the originating node 10 to the destination node that an error with the packet was detected. The originating node 10 may respond to the E2E NAK packet 17 by causing the packet to be resent through network which may include processing device 100 or other processing devices. That is, the originating node 10 may cause the packet to be resent along the same path or a different path.

LLR includes a receiving node detecting an error with a packet and sending a link level NAK message to the transmitting node so that the transmitting node will resend the packet on the link. In accordance with the disclosed examples, however, the link level NAK message is implemented but the transmitting node does not respond to the retry message by resending the requested packet. Instead, the transmitting node sends an E2E NAK packet back to the originating node to cause the network's E2E retry process to re-send the packet back into the network fabric.

Figure 2:
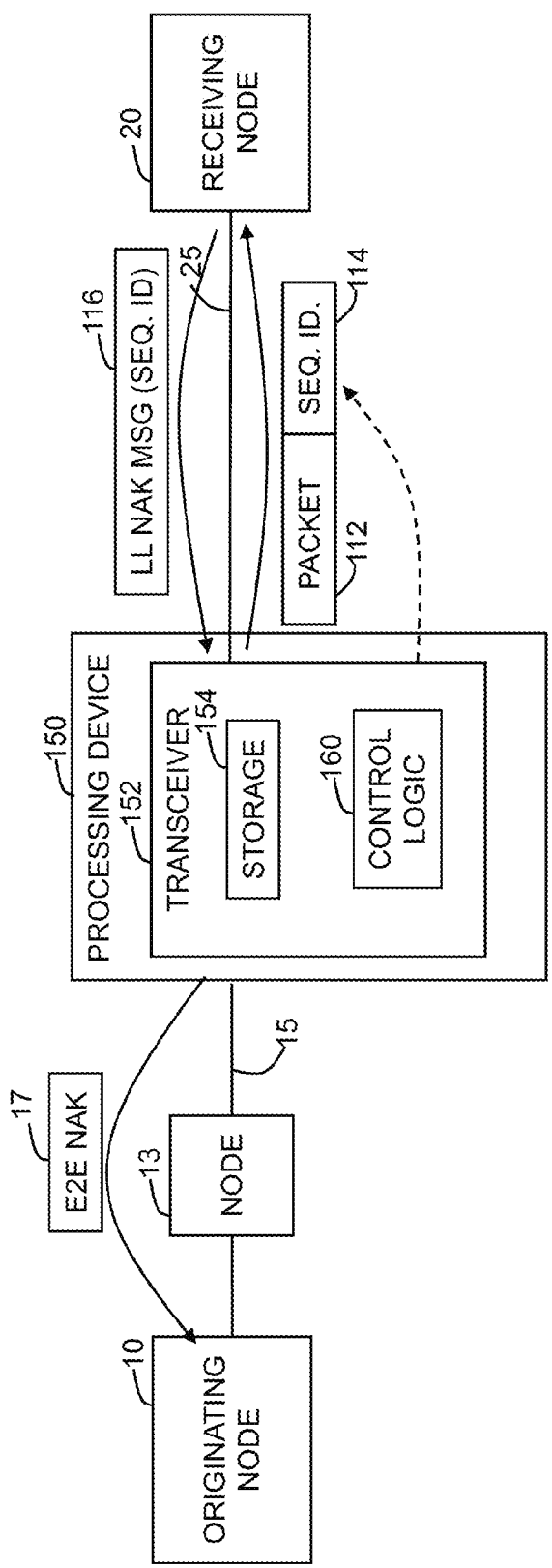
FIG. 2 shows another system in accordance with various examples.

FIG. 2 shows another example of a processing device 150 coupled to the originating node 10 over link 15 and to the receiving node 20 over link 25. The block diagram of FIG. 2 is similar to that of FIG. 1. One difference, however, is that the processing device 150 in FIG. 2 includes a transceiver 152 and control logic 160, and the transceiver 152 includes storage 154. Storage 154 may be volatile storage (e.g., random access memory) or non-volatile storage. The control logic 160 may be implemented in much the same way, and may perform much the same operations, as described above for control logic 120 of FIG. 1. Another difference in FIG. 2 is that FIG. 2 illustrates that processing device 150 couples to another intermediate node 13 via link 15 and that the intermediate node 13 couples to the originating node 10. Thus, when the processing device 150 generates and transmits an E2E NAK packet 17, the E2E NAK packet 17 is routed through the intermediate node 13 back to the originating node 10.

As noted above, receiving node 20 may also include a transceiver which functions similar to receiver 110. Thus, the transceiver in node 20 may send packets to processing device 100, receive link level ACKs and link level NAKs from the processing device, and respond in much the same way as explained above regarding the transceiver 110 of processing device 100.

The example of FIG. 2 illustrates that the transceiver 152 of the processing device has, or has access to, storage 154. Storage 154 may not be large enough, or may not be used, to store packets (e.g., packet 112) that are forwarded on across link 25 to receiving node 20. Without the use of local storage to store copies of transmitted packets, the processing device is unable to respond to a link level NAK message to retrieve and resend a packet detected to have an error by the receiving node 20.

Figure 3:
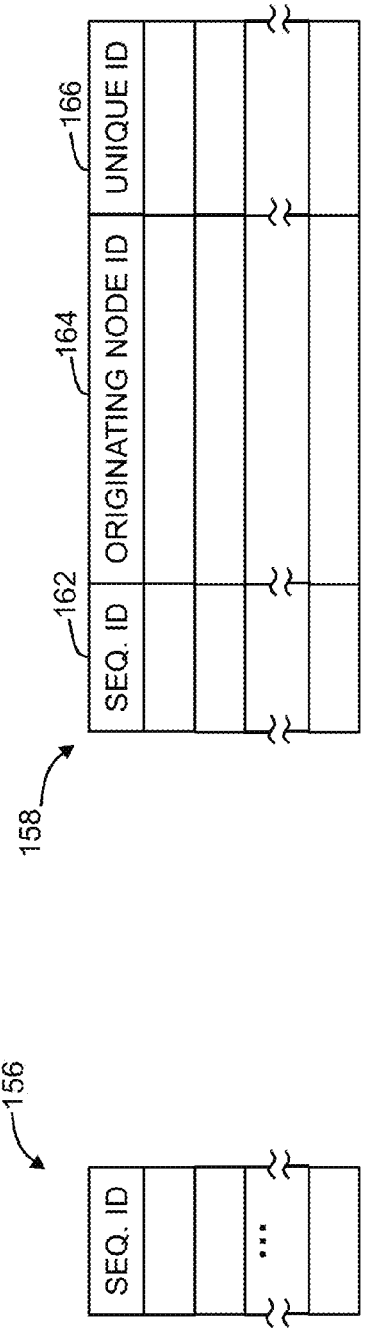
FIG. 3 shows sequence identifiers in storage of a transceiver in accordance with various examples.

The processing device 150 may have some storage such as storage 154 to store sequence identifiers for the packets transmitted across the link 25. Thus, the transceiver 152 can store the sequence numbers of packets it transmits in case the processing device receives a link level NAK message 116 associated with any of those packets. FIG. 3 illustrates that storage 154 may store one or more sequence identifiers for the various packets transmitted across link 25, although additional information may be included in storage 154 as well. If and when the receiving node 20 sends an acknowledgment message back to the processing device 150 that certain packets have been correctly received (no errors), the control logic 160 may remove the sequence numbers from storage 154 corresponding to the packets that are identified as having been successfully transmitted to receiving node 20.

Figure 4:
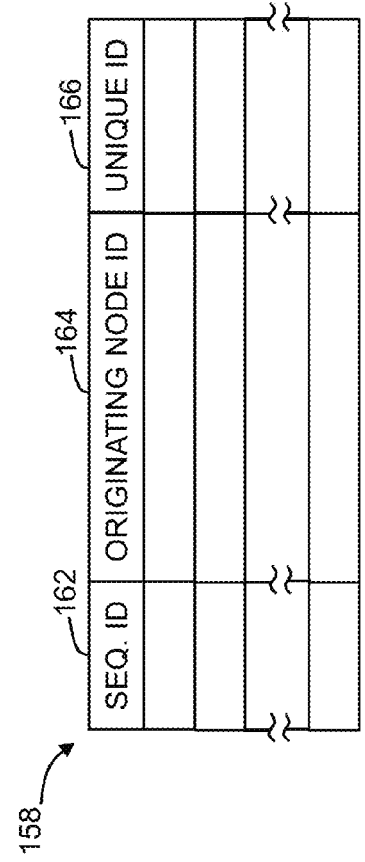
FIG. 4 shows sequence identifiers, originating node identifiers, and unique packet identifiers in storage of a transceiver in accordance with various examples.

FIG. 4 illustrates another example of the contents of storage 154. In this example, the storage 154 includes, for each packet transmitted across link 25, any or all of: the sequence identifier 162 of the packet, an identifier 164 of the node that originated the packet (originating node identifier) and a unique packet identifier 166. The unique packet identifier identifies the particular packet which needs to be re-sent by the E2E mechanism, since a given originating endpoint may have multiple outstanding packets at the same time. The unique identifier, for example, may be the same identifier used within the E2ED ACK packets in the E2E retry scheme to identify successfully delivered packets. The unique packet identifier may be a purpose-added serial number generated by the originating endpoint node and carried in every packet, or it may be derived from some other field(s) in the packet header which are already known to be unique—for example, a protocol-layer transaction identifier in architectures where this is guaranteed to be unique. The originating node identifier may include an address (e.g., an internet protocol (IP) address of the originating node or some other identifier by which the processing device can determine to where to send to the E2E NAK packet 17. The E2E NAK packet 17 may be sent to the originating node identifier of the packet determined not have been received correctly by the receiving node 20, and may contain the unique packet identifier associated with that packet.

Figure 5:
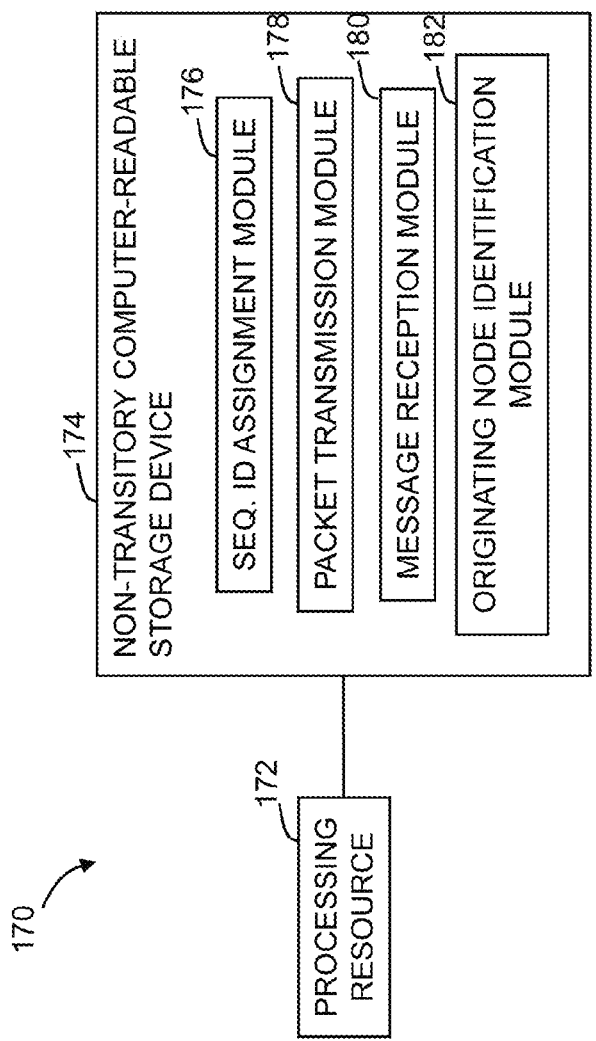
FIG. 5 shows an example of a non-transitory computer-readable storage device in accordance with various examples.

FIG. 5 illustrates an example of an implementation of control logic 120, 160. In this example, a processing resource 172 is coupled to a non-transitory, computer readable storage device 174. The non-transitory, computer readable storage device 174 may include volatile storage (e.g., random access memory), non-volatile storage (e.g., solid state storage, magnetic storage, optical storage, etc.) or combinations thereof. The storage device 174 contains machine executable instructions that may be executed by the processing resource 172.

The processing resource 172 may include an application specific integrated circuit (ASIC), a field-programmable gate array (FPA), discrete logic, a single hardware processor, multiple hardware processors, a single computer, or a network of computers. The machine instructions include various software modules 176, 178, 180, and 182 that, when executed by the processing resource 172, cause the processing resource to perform various operations as described below. The software modules 176-182 may be implemented as separate modules or various groups of all of the software modules may be implemented as a single software module.

The sequence identifier assignment module 176 causes the processing resource 172 to assign a unique sequence identifier to each packet to be transmitted across a link to a receiving node (e.g., across link 25 to receiving node 20). The sequence identifiers may be numbers and the processing resource 172 may assign each new packet a sequence identifier by incrementing a sequence identifier used for a preceding packet.

If and when the receiving node 20 detects an error with a packet transmitted by the processing device 100, 150, the receiving node sends a link level NAK message 116 including the sequence identifier of the packet detected to have an error. The message reception module 280 causes the processing resource 172 to receive the link level NAK message 116 from the receiving node 20 over link 25. Based on the received link level NAK message, the originating node identification module 182 causes the processing resource 172 to determine the identity of the node that originated the packet identified by the link level NAK message. The packet transmission module 178 then causes the processing resource to cause the transceiver 110, 152 to transmit an E2E NAK packet to the originating node, and not to retry the packet on the link 25. In some implementations, the originating node identification module 182 causes the processing resource 172 to determine the identity of the originating node by examining the storage 154. For example and with reference to FIG. 4, the originating node identification module 182 causes the processing resource 172 to obtain the originating node identifier 164 corresponding to the sequence identifier 162 contained in the link level NAK message 116.

The packet transmission module 178 also may cause the processing resource 172 to cause the transceiver 110, 152 to transmit packets across link 25 to the receiving node 20—packets that may subsequently be determined by the receiving node to have errors as explained above.

Some networks may implement virtual channels over their physical links. Virtual channels allow a multiplicity of independent channels of communication (i.e., independent streams of packets) to share a single physical link, and by extension, to share an end-to-end route. Virtual channels are independent of each other in terms of storage allocation in queues, independent in flow control, and independent in competing for access to the physical links that they share. Thus, packets on one virtual channel do not head-of-line block packets on another virtual channel. At the link level, multiple virtual channels may be implemented by time multiplexing of the physical link between the virtual channels, and by communicating independent flow-control information for each virtual channel across each link. Endpoint protocols obey conventions with regard to which virtual channels are used to carry which packet types—for example to avoid potential deadlocks. Since E2E NAK packets are routable packets in their own right, and potentially victims of head-of-line blocking, E2E NAK packets should obey virtual channel conventions consistent with that used when endpoint nodes generate new packets. For example, E2E NAK packets may travel on the same virtual channel that is used by the endpoint nodes to send end-to-end packet delivery acknowledgement packets. This would be a virtual channel that has no protocol layer dependencies upon the channel carrying the packets being protected.

Figure 6:
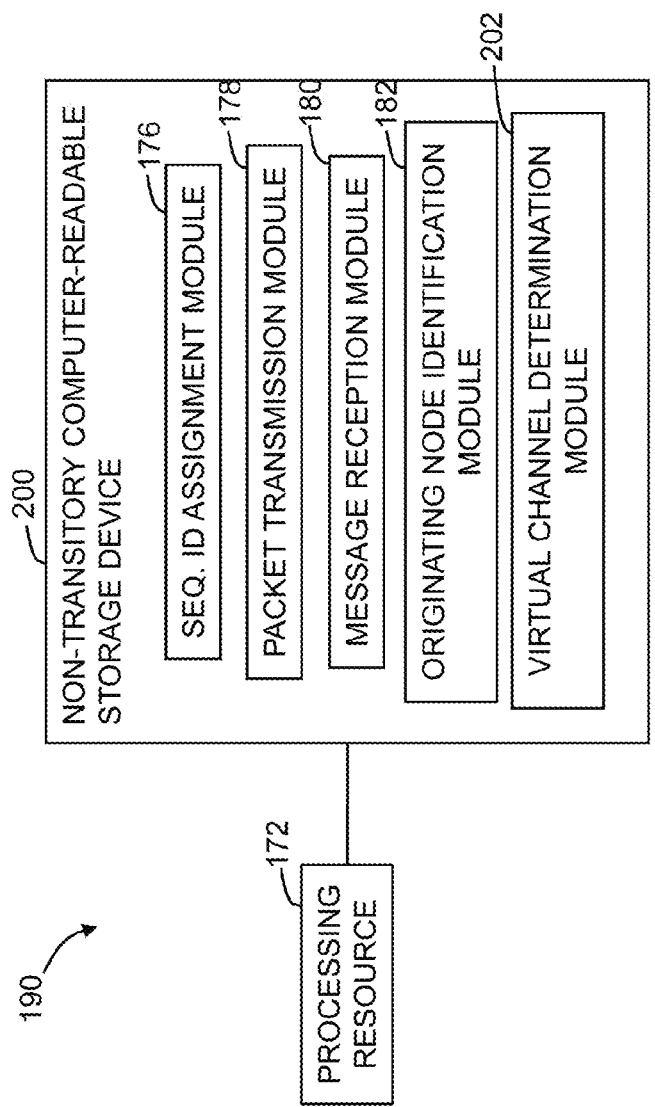
FIG. 6 shows an example of a non-transitory computer-readable storage device in accordance with various examples.

FIG. 6 illustrates another example of a non-transitory, computer readable storage device 200. The software modules depicted in FIG. 6 includes some of the same software modules as in FIG. 5. FIG. 6, however, shows that the non-transitory, computer readable storage device 200 includes a virtual channel determination module 202. The virtual channel determination module 202 causes the processing resource 172 to determine over which virtual channel the processing resource is to cause the E2E NAK packet 17 to be transmitted. If the network implements a virtual channel for control packets, then the virtual channel determination module 202 may causes the processing resource 172 to use the control packet virtual channel to send the E2E NAK packet.

Figure 7:
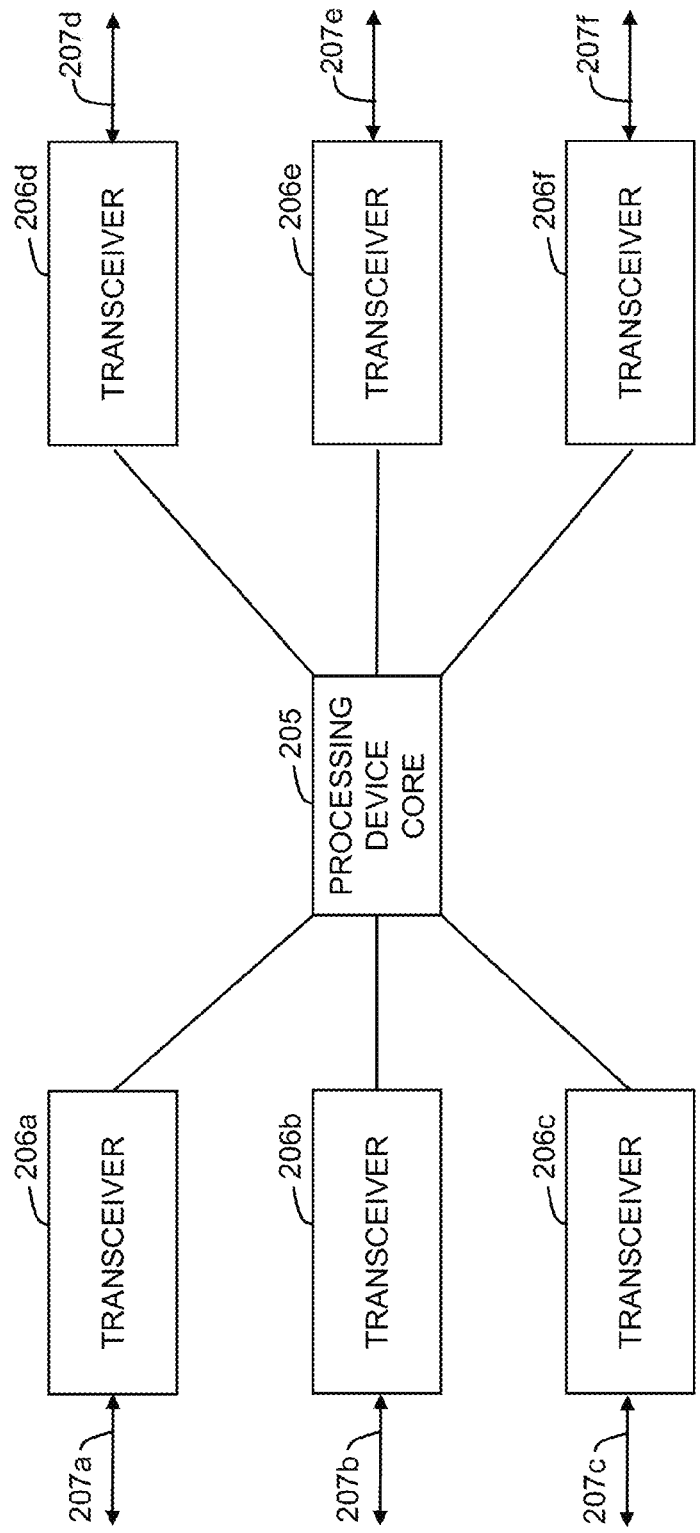
FIG. 7 illustrates a processing device in accordance with example.

FIG. 7 illustrates an example of a processing device that includes a processing device core 205 coupled to six transceivers 206a-206f, although the number of transceivers may vary. Each transceiver 206a-206f couples to its own link 207a-207f as shown. A packet received on any one link 207a-207f may be provided by that transceiver to the processing device core 205 for a determination as through which other transceiver/link to forward the packet.

Figure 8:
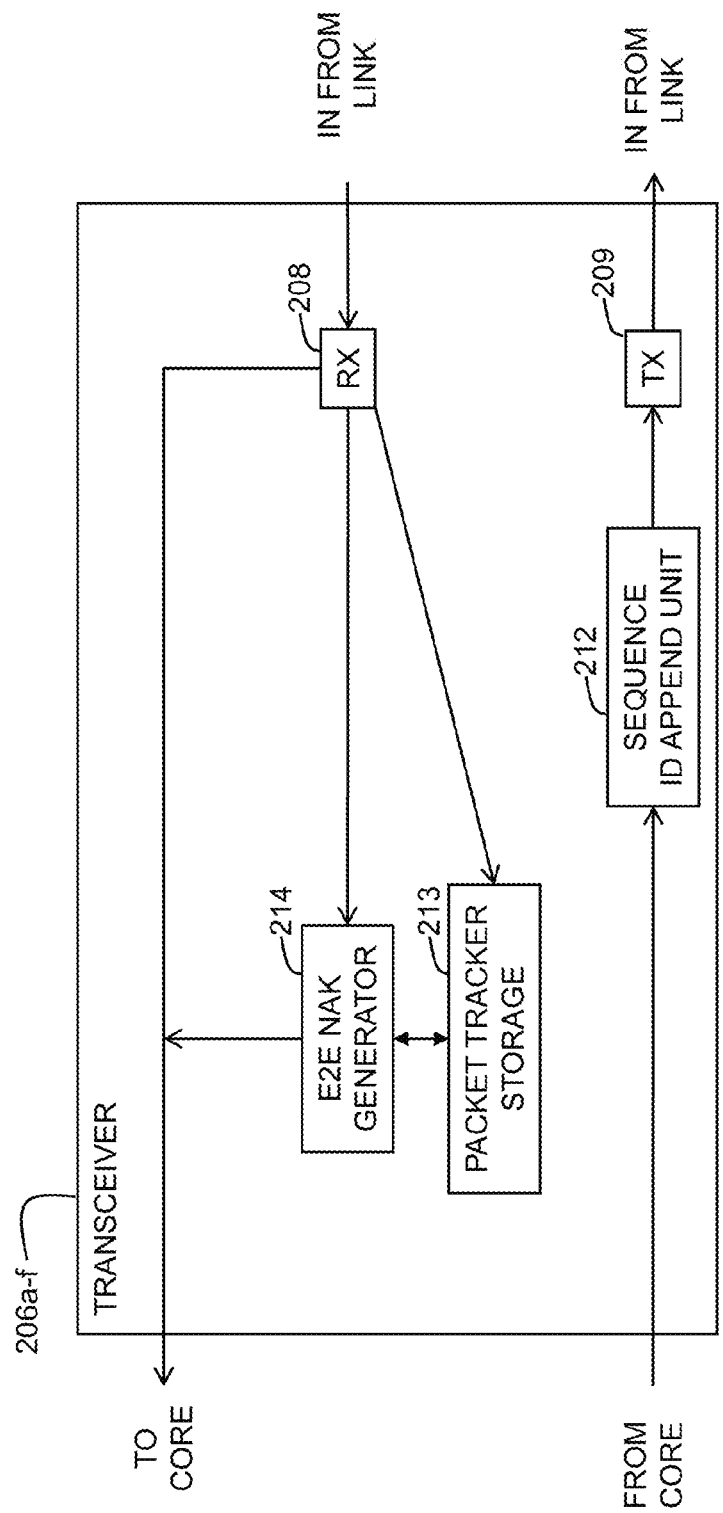
FIG. 8 illustrates a transceiver usable in the processing device of FIG. 7 in accordance with an example.

FIG. 8 illustrates an example of at least some of a transceiver 206a-f. The illustrative transceiver includes a receiver (RX) 208 and transmitter (TX) 209 which provide connectivity to that transceiver's link. The RX 208 sends incoming packets to the processing device core 205 for a determination, for example, as to how to forward on the packets. Packets received by other transceivers that the processing device core 205 determines should be transmitted out by a particular transceiver are provided by the core to the sequence identifier append unit 212. A sequence identifier is determined for, and appended to, the outgoing packet by the sequence identifier append unit 212, and the resulting packet with sequence identifier is provided the TX 209 for transmission to another node over the transceiver's link.

Packet tracker storage 213 provides storage, as explained above, for information from which the transceiver is able to determine the originating node for a given packet. If the transceiver receives a link level ACK message via RX 208 from another node indicating one or more packets were received without an error, the RX 208 causes the corresponding entries for those packets in the packet tracker storage 213 to be removed.

If, however, a packet is determined to have an error by a node to which the TX 209 sent the packet, the RX 208 will receive a link level NAK message indicating the existence of the error. The RX may respond to the link level NAK message by causing the E2E NAK generator 214 to generate an E2E NAK packet. The E2E NAK generator 214 may access the packet tracker storage 213 to determine the identity of the source of the packet experiencing the error in order to generate the E2E NAK packet. The E2E NAK generator 214 provides the E2E NAK packet to the processing device core 205. The processing device core 215 then causes the E2E NAK packet to be transmitted by another transceiver back towards the target originating node so that the originating node can cause the packet to be re-sent through the fabric.

Figure 9:
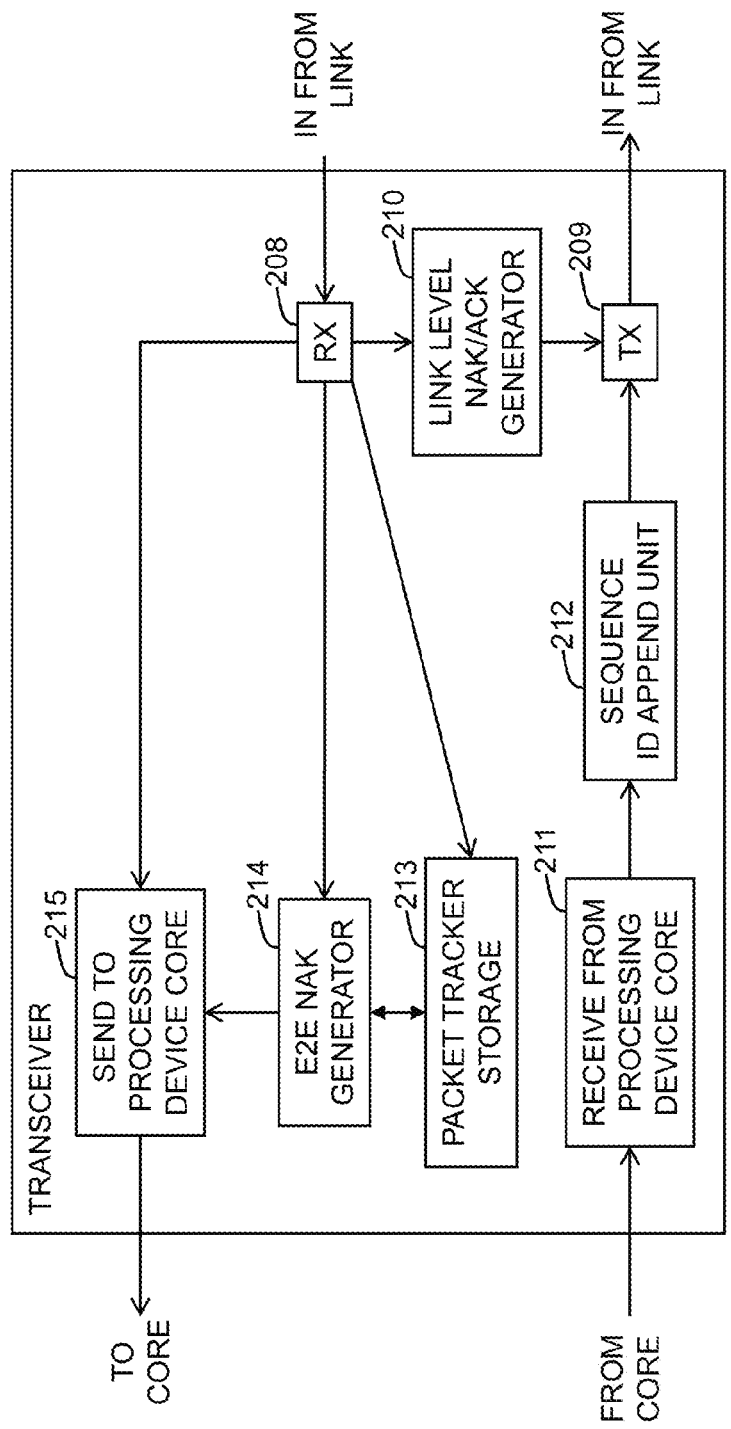
FIG. 9 illustrates a transceiver usable in the processing device of FIG. 7 in accordance with another example.

FIG. 9 illustrates another example of a transceiver. The illustrative transceiver includes RX 208 and TX 209 which provide connectivity to that transceiver's link as explained above. A link level negative acknowledgment/acknowledgment (NAK/ACK) generator 210 receives an indication from the RX 208 as to whether an error was detected for an incoming packet. In other implementations, the link level NAK/ACK generator 210 itself determines whether an error occurred. The link level NAK/ACK generator 210 causes the TX 209 to send back across the link level NAK and link level ACK messages as appropriate depending on whether or not packet errors are detected.

The send to processing device core block 215 provides packets received via RX 208 to the processing device core 205 for a determination, for example, as to how to forward on the packets. Packets that the processing device core 205 determines should be transmitted out by the transceiver are provided by the core to the receive from processing device core block 211. A sequence identifier is determined for, and appended to, the outgoing packet by the sequence identifier append unit 212 and the resulting packet with sequence identifier is provided the TX 209 for transmission.

Packet tracker storage 213 provides storage, as explained above, for information from which the transceiver is able to determine the originating node for a given packet. If the transceiver receives a link level ACK message via RX 208 from another node indicating one or more packets were received without an error, the RX 208 causes the corresponding entries for those packets in the packet tracker storage 213 to be removed.

If, however, a packet is determined to have an error by a node to which the TX 209 sent the packet, the RX 208 will receive a link level NAK message indicating the existence of the error. The RX may respond to the link level NAK message by causing the E2E NAK generator 214 to generate an E2E NAK packet. The E2E NAK generator 214 may access the packet tracker storage 213 to determine the identity of the source of the packet experiencing the error in order to generate the E2E NAK packet. The E2E NAK generator 214 provides the E2E NAK packet to the processing device core 205 via the send to processing device core block 215. The processing device core 215 then causes the E2E NAK packet to be transmitted by another transceiver back towards the target originating node so that the originating node can cause the packet to be re-sent through the fabric.

Figure 10:
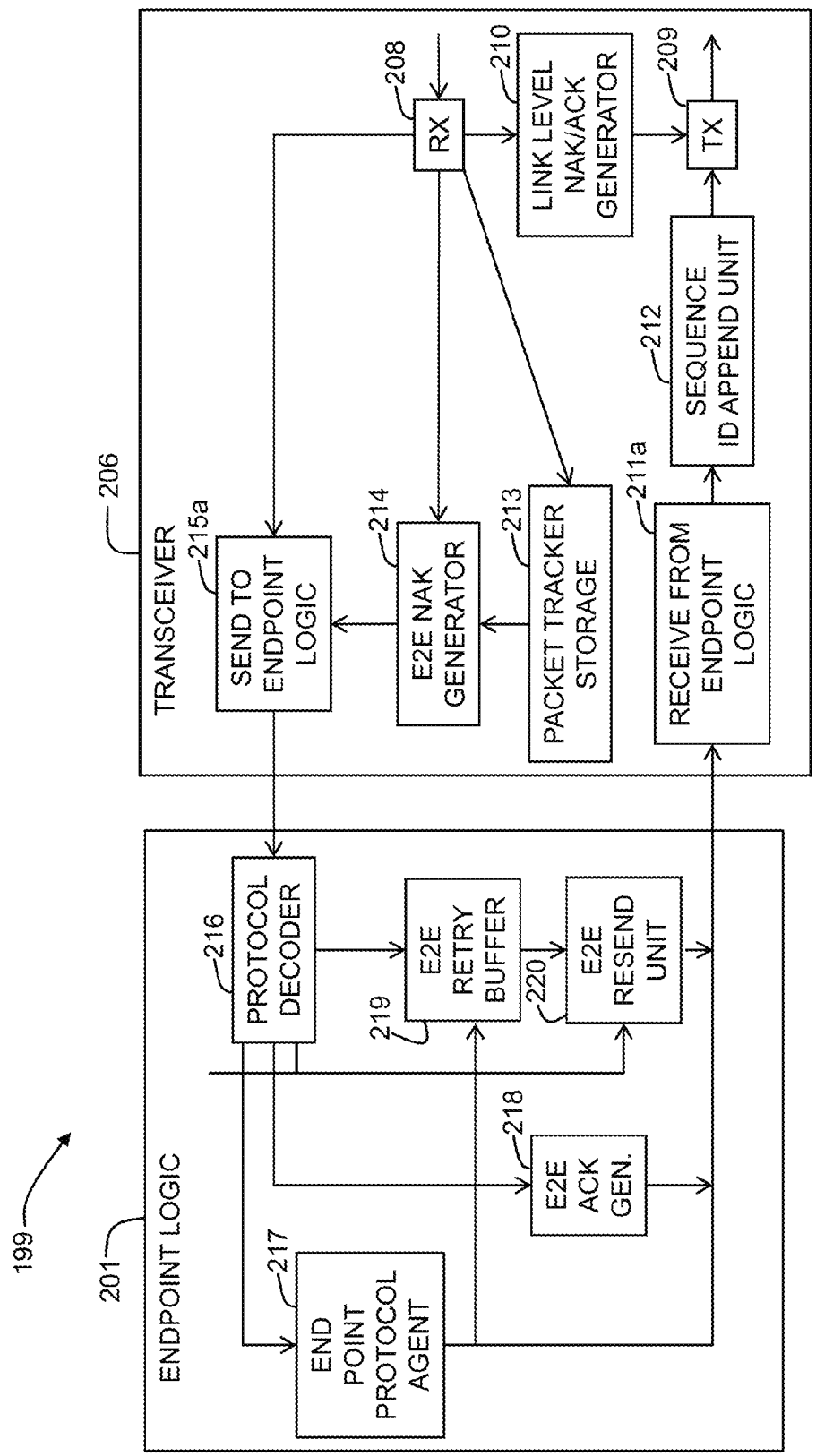
FIG. 10 illustrates an endpoint node in accordance with an example.

FIG. 10 illustrates an endpoint node 199. The endpoint node of the example of FIG. 10 includes a transceiver 206 such as that described above coupled to endpoint logic 201. The send to/from processing device core blocks have been relabeled as send to endpoint logic block 215a and receive from endpoint logic block 211a, but generally, the transceiver 203 functions in much the same way as described above.

The endpoint logic 201 includes a protocol decoder 216 which decodes packets received by the transceiver 203. Healthy received packets are provided to the endpoint protocol agent 217 for consumption and to an E2E ACK generator 218 for generation of an E2E ACK to be transmitted back to the originator of the packet. The endpoint protocol agent 217 may generate new packets which may be provided to the E2E retry buffer 219, where a copy is stored against the possibility that future resends may be needed.

If the transceiver 203 receives an E2E NAK packet (which indicates that a packet originated by the endpoint node 199 was determined to have an error by the fabric), the protocol decoder 216 sends a signal to the E2E resend unit 220 to resend that packet indicated by the E2E NAK packet.

The E2E resend unit 220 may include timers that determine when a threshold amount of time has elapsed after the endpoint node 199 has transmitted a particular packet with neither an E2E NAK packet nor an E2E ACK packet indicating successful receipt of the original packet. If the original packet was determined by an intermediate node to have an error, as described above, the originating endpoint node will receive an E2E NAK packet indicating an error with that particular packet. If, however, the E2E NAK packet is unable to be transmitted all of the way back to the endpoint node (e.g., due to transmission problems with the fabric, interference, etc.), then the timer functionality present in the E2E resend unit 220 will cause the cause the packet to be resent anyway.

Figure 11:
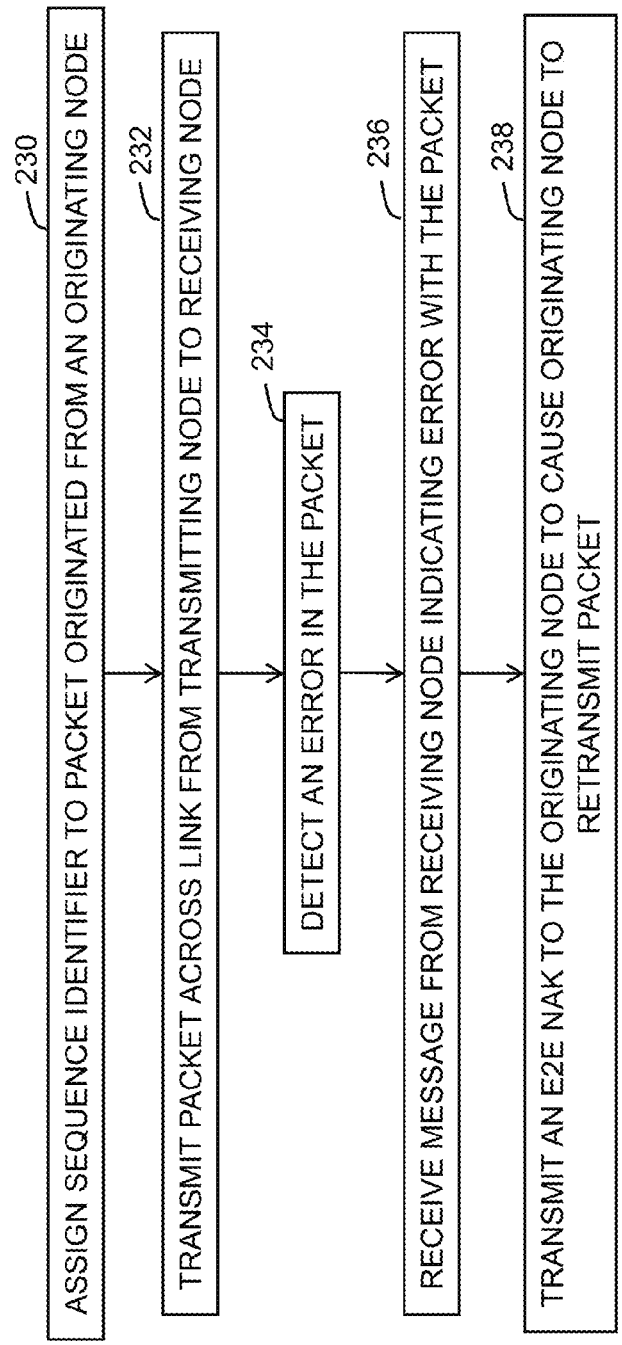
FIG. 11 shows a method in accordance with various examples.

FIG. 11 illustrates a method in accordance with various examples. The operations of the method may be performed in the order shown, or in a different order. Further, two or more of the operations may be performed in parallel rather than sequentially.

At 230, the method includes assigning a sequence identifier to a packet that originated from an originating node. This operation may be performed the processing resource 172 executing the sequence identifier assignment module 176 as explained previously.

At 232, the method includes transmitting the packet across a link from a transmitting node to a receiving node. For example, a packet 112 may be transmitted from processing device 100, 150 to receiving node 20.

At 234, the method includes detecting an error in the packet at the receiving node. This operation may be performed by computing a cyclic redundant check (CRC) value based on the received message and comparing the computed CRC value against a CRC value contained in the packet itself. A mismatch of CRC values indicates the presence of an error.

At 236, the method includes receiving a message (e.g., a link level NAK message 116) from the receiving node 20 indicating an error having occurred with the packet and the sequence identifier of the packet experiencing the error. At 238, the method includes transmitting, by the transmitting node (e.g., processing device 100, 150), an E2E NAK packet to the originating node to cause the originating node to retransmit the packet through the network.

Figure 12:
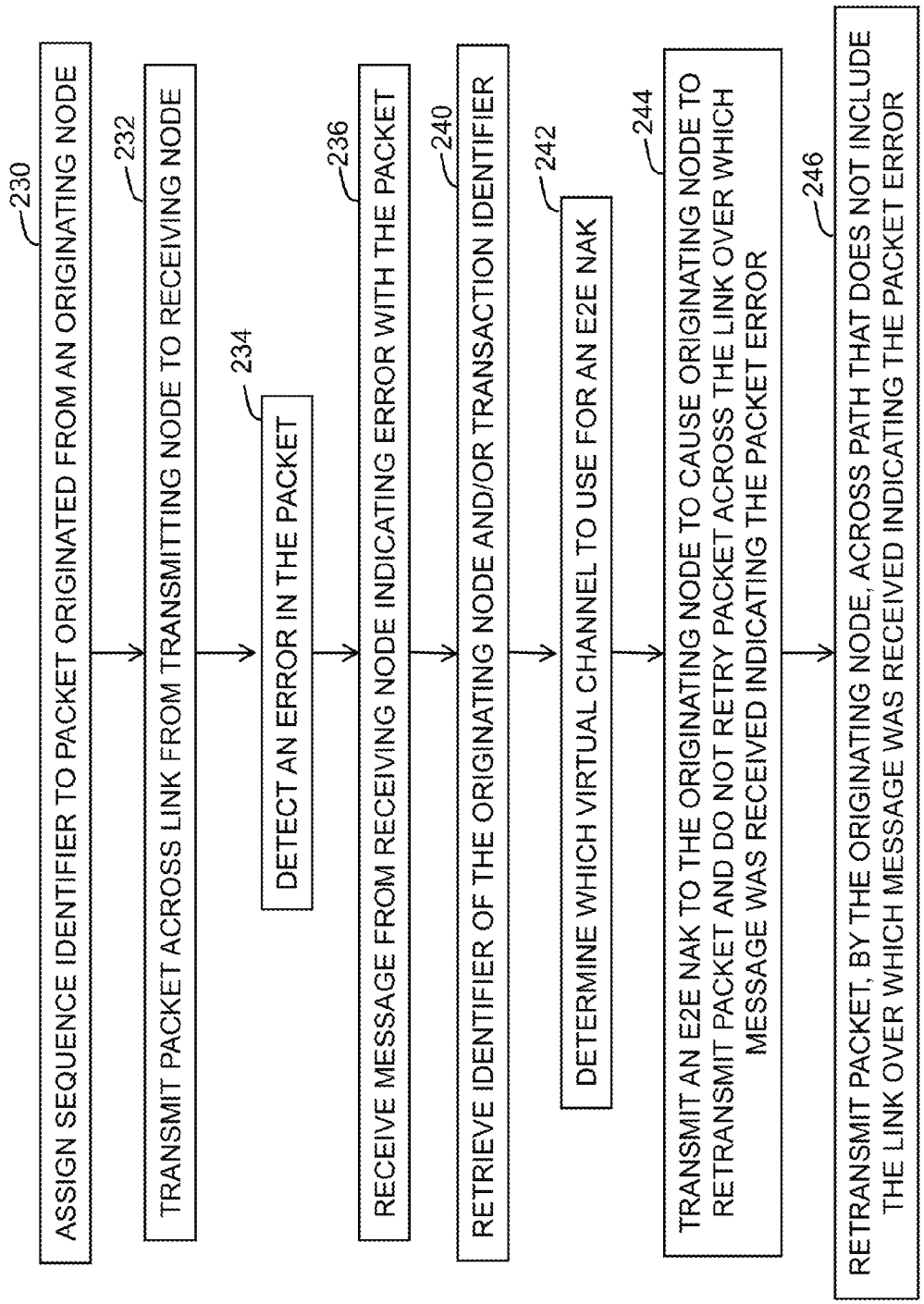
FIG. 12 shows another method in accordance with various examples.

FIG. 12 illustrates another example of a method including operations 230, 232, 234, 236, 240, 242, 244, and 246. The operations of the method may be performed in the order shown, or in a different order. Further, two or more of the operations may be performed in parallel rather than sequentially. Operations 230-236 are the same as described above regarding FIG. 10 and thus are not repeated here.

At 240, the method includes, based on receiving the message from the receiving node, retrieving an identifier of the originating node from storage in the transmitting node (e.g., storage 154). At 242, the method includes determining which virtual channel to use for the E2E NAK packet out of a plurality of virtual channels used in the network.

At 244, the method includes, rather than retrying the packet across the same link again, transmitting an E2E NAK packet to the originating node (over the determined virtual channel) to cause the originating node to retransmit the packet through the network. At 246, the method further includes retransmitting the packet. The packet may be retransmitted across a path that does not include the link over which the original packet was sent and received in error (e.g., link 25).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processing device, comprising:
    a transceiver to be coupled to a link;
    control logic accessible to the transceiver, the control logic to:
    assign a unique sequence identifier to each packet to be transmitted across the link to a receiving node;
    transmit packets via the transceiver across the link to the receiving node, each packet to have a unique sequence identifier;
    receive a link level negative acknowledgement (NAK) message from the receiving node, the message containing the sequence identifier of a packet not correctly received by the receiving node; and
    based on the received message, cause an end-to-end negative acknowledgment (E2E NAK) packet to be transmitted to an originating node of the packet not correctly received; and
    storage for the sequence identifiers but not for the packets transmitted across the link.

2. The processing device of claim 1 wherein each assigned sequence identifier does not follow the packet across multiple links.

3. The processing device of claim 1 wherein the storage is further for storing originating node identifiers and unique packet identifiers, each originating node identifier uniquely to identify the originating node that originated a given packet and each unique packet identifier to identify that particular packet, and wherein the E2E NAK packet includes the unique packet identifier associated with a packet not having been correctly received by the receiving node.

4. The processing device of claim 1 wherein the control logic is to transmit the E2E NAK packet on a virtual channel.

5. A transceiver, comprising:
    a receiver to couple to a link;
    a transmitter to couple to the link;
    a sequence identifier append unit to assign a unique sequence identifier to each packet to be transmitted across the link by the transmitter;
    storage for the sequence identifiers but not for the packets transmitted across the link;
    an end-to-end negative acknowledgment (E2E NAK) generator coupled to the receiver and to generate an E2E NAK packet based on a link level negative acknowledgement (NAK) message received over the link by the receiver and containing the sequence identifier of a packet determined to have an error; and
    a packet tracker storage to include information usable to identify an originating node of each packet transmitted by the transmitter and unique packet information to identify each such packet;
    wherein, the E2E NAK generator is to access the packet tracker storage to determine an identify of the originating node of a packet indicated by the message as not correctly received and to generate and transmit an end-to-end negative acknowledgment (E2E NAK) packet to the originating node and not retry the packet on the link on the link.

6. The transceiver of claim 5 wherein the information in the packet tracker storage includes, for each packet transmitted by the transmitter, a sequence identifier of the packet, an originating node identifier, and a unique packet identifier.

7. The transceiver of claim 5 wherein the E2E NAK packet also includes a unique packet identifier to identify the packet not correctly received.

8. The transceiver of claim 5 wherein the message received by the receiver is a link level NAK message.

9. A method, comprising:
    assigning a sequence identifier to a packet, wherein the packet originated from an originating node;
    transmitting the packet across a link from a transmitting node to a receiving node;
    storing the sequence identifier but not for the packet transmitted across the link;
    detecting an error in the packet at the receiving node;

receiving a link level negative acknowledgement (NAK) message from the receiving node indicating an error having occurred with the packet and the sequence identifier of the packet experiencing the error; and transmitting, by the transmitting node, an end-to-end negative acknowledgment (E2E NAK) packet to the originating node to cause the originating node to retransmit the packet.

10. The method of claim 9 further comprising retransmitting the packet across a path that does not include the link.

11. The method of claim 9 further comprising, based on receiving the message from the receiving node, retrieving an identifier of the originating node from storage in the transmitting node.

12. The method of claim 11 further comprising generating the E2E NAK packet to include the identifier of the originating node and a unique identifier of the packet for which the error was detected.

13. The method of claim 10 further comprising not retrying the packet, by the transmitting node, across the link.

14. The method of claim 10 further comprising determining which virtual channel to use for the E2E NAK packet out of a plurality of virtual channels.

* * * * *